United States Patent [19]

Khakzar

[11] Patent Number: 5,781,623
[45] Date of Patent: Jul. 14, 1998

[54] METHOD OF CONTROLLING AN ACCESS NETWORK AS WELL AS EXCHANGE AND ACCESS NETWORK

[75] Inventor: Karim Khakzar, Sterrebeek, Germany

[73] Assignee: Alcatel N.V., Rijswijk, Netherlands

[21] Appl. No.: 606,315

[22] Filed: Feb. 23, 1996

[30] Foreign Application Priority Data

Mar. 8, 1995 [DE] Germany ............ 195 08 081.5

[51] Int. Cl.$^6$ ............................................. H04M 7/00
[52] U.S. Cl. ............. 379/230; 379/207; 379/229; 370/437
[58] Field of Search .................... 379/207, 229, 379/230; 370/264, 434, 437, 438

[56] References Cited

U.S. PATENT DOCUMENTS 5,247,571  9/1993  Kay et al. .................. 379/207

FOREIGN PATENT DOCUMENTS

| 1964846 | 9/1979  | Germany . |
| 4000921 | 11/1991 | Germany . |
| 4221474 | 10/1992 | Germany . |
| 4329172 | 3/1995  | Germany . |
| 4209041 | 6/1995  | Germany . |

OTHER PUBLICATIONS

Frequenz V 48 n 1–2, Jan.–Feb. 1994 Journal, Entitled "Q3 Interface Specification at the Access Network for the Management of V5 Interfaces . . . ", abstract.
Symposium Record NOMS Article Entitled The Configuration Management of Access Networks with V5 Interface, 1994 IEEE Network Operations & Management Symposium (Cat. No. 94CH3398–5, vol. 2, Abstract.
A. Zanettin "Multiprotokoll–Router LMX 506 aus der COMPAC–Familie", Philips Telecommunication Rev., vol. 51, No. 3, pp. 17–25.

W. Rink, "Intelligent Networks", Nachrichtentech., Elektron Berlin 40 (1990) pp. 162–164.

D. Taranne, "Centrex", Elektrisches Nachrichtenwesen, Band 63, No. 1 1989, pp. 57–63.

"pr ETS 300 347–1, Final Draft, Signalling Protocols and Switching , V5 interface for support of Access Network, Part 1: V5.2 interface specification" of Apr. 1994.

*Primary Examiner*—Ahmad F. Matar
*Attorney, Agent, or Firm*—Ware, Fressola, Van Der Sluys & Adolphson LLP

[57] ABSTRACT

The invention concerns a method of controlling an access network (AN) with a number of user ports by means of an exchange (LE) connected to the access network (AN) via an interface, as well as such an exchange (LE) and such an access network (AN). The exchange (LE) and the access network (AN) exchange user data via a number of bearer channels, and messages associated with different protocols (PSTNP, LCP, CP, BCCP) via at least one control channel. Each of the protocols (PSTNP, LCP, CP, BCCP) is formed by a set of messages for performing a specific task, and the association of a message to one of the protocols (PSTNP, LCP, CP, BCCP) is entered in the message as part thereof. The exchange (LE) and the access network (AN) exchange messages according to one of the protocols (BCCP) via one of the control channels, which serves to dynamically allocate bearer channels to user ports, and wherein by means of said messages the switching of connections between user ports and the exchange (LE) via a particular bearer channel is controlled by the exchange (LE). Further messages (M7 to M15) are used in the protocol (BCCP) for the dynamic allocation of bearer channels to establish and release interconnections in the access network (AN). The establishment and the release of such interconnections is controlled by the exchange (LE) with the protocol (BCCP) extended in this manner.

9 Claims, 5 Drawing Sheets

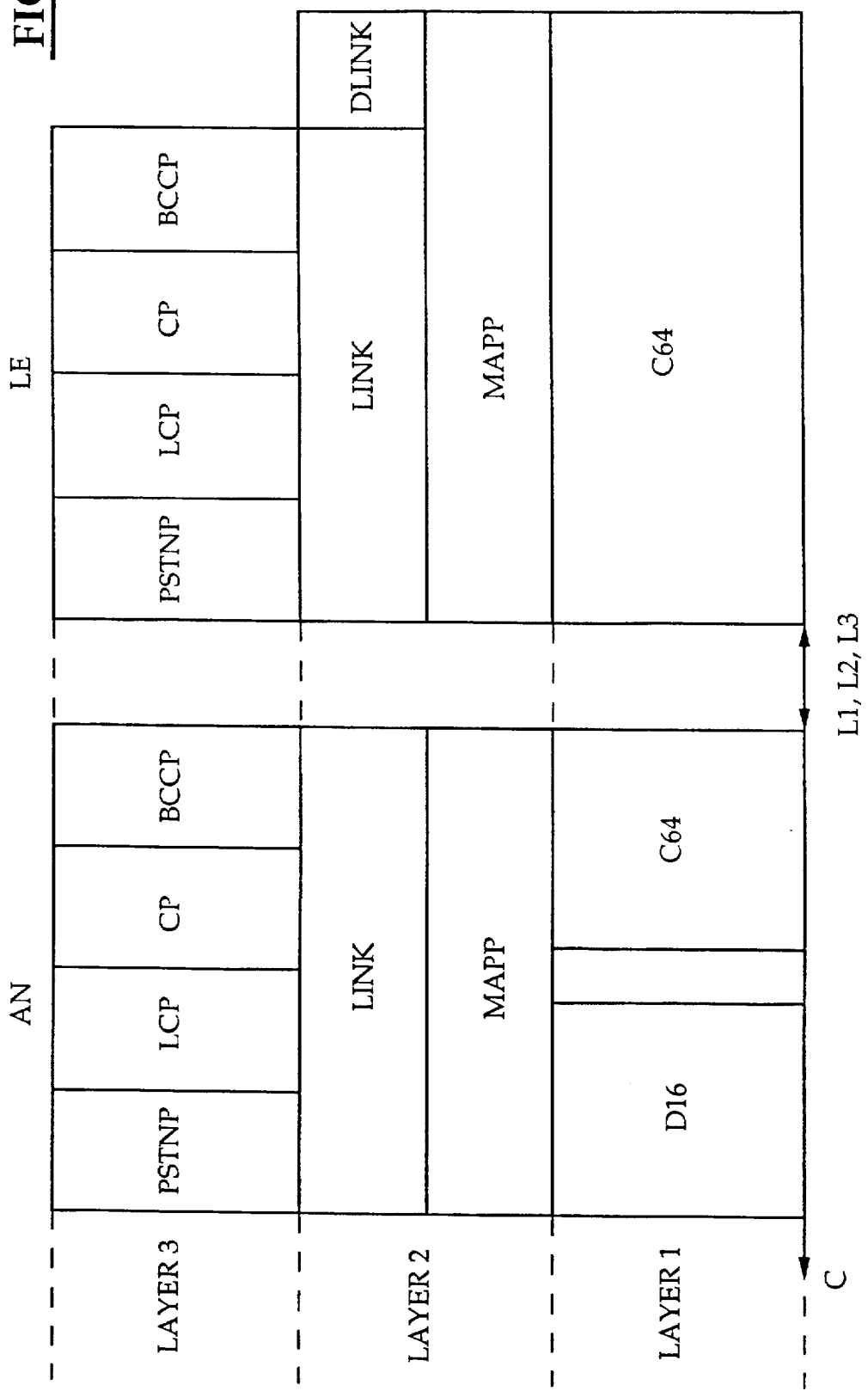

| M1 | ALLOCATION | LE → AN |
|---|---|---|
| M2 | ALLOCATION COMPLETE | LE ← AN |
| M3 | ALLOCATION REJECT | LE ← AN |
| M4 | DE-ALLOCATION | LE → AN |
| M5 | DE-ALLOCATION COMPLETE | LE ← AN |
| M6 | DE-ALLOCATION REJECT | LE ← AN |
| M7 | INTERCONNECTION | LE → AN |
| M8 | INTERCONNECTION COMPLETE | LE ← AN |
| M9 | INTERCONNECTION REJECT | LE ← AN |
| M10 | INTERRUPTION | LE → AN |
| M11 | INTTERUPTION COMPLETE | LE ← AN |
| M12 | INTERRUPTION REJECT | LE ← AN |
| M13 | RE-ALLOCATION | LE → AN |
| M14 | RE-ALLOCATION COMPLETE | LE ← AN |
| M15 | RE-ALLOCATION REJECT | LE ← AN |
| M16 | AUDIT | LE → AN |
| M17 | AUDIT COMPLETE | LE ← AN |

FIG. 3

METHOD OF CONTROLLING AN ACCESS NETWORK AS WELL AS EXCHANGE AND ACCESS NETWORK

TECHNICAL FIELD

The invention concerns a method of controlling an access network, an exchange, and an access network.

BACKGROUND OF THE INVENTION

When using optical telecommunications in the user port area, efforts are made above all not to connect directly to an exchange, but rather via a concentrating access network.

The invention starts with an access network designed for this purpose, whose principal construction corresponds for example to that of an access network which is connected to an exchange via an ETSI-specified V5.2 interface. Its operation is described in the specification "pr ETS 300 347-1, Final Draft, Signalling Protocols and Switching. V5 interface for support of Access Network, Part 1: V5.2 interface specification" of April 1994.

Through the V5.2 interface, an access network is connected to an exchange via up to 16 physical connection lines. The access network provides the user ports and the exchange performs all the exchange-switching and service-relevant tasks.

A number of transmission channels and several control channels are available for exchanging data between the exchange and the access network. These control channels exchange messages which serve the transparent transmission of ISDN signals (ISDN=Integrated Services Digital Network) for ISDN user ports in the access network, or which are allocated to one of five protocols serving to control the access network through the exchange. Each of these messages is provided with a protocol-specific identification. Each of the protocols fulfills a specific task, for example the dynamic allocation of the transmission channels to the user ports, the transmission of PSTN signalling information (PSTN=Public Switched Telephone Network), securing the control channels when physical connection lines fail, or controlling the operating conditions of the user ports. With the sets of messages available in this way, it is possible to control in a simple manner all the important functions of the access network from the exchange. In this way, all exchange-switching and service-relevant tasks remain in the exchange, and the access network is not dependent on the realization of exchange-switching functions specified by the manufacturer.

The number of users that can be connected to the access network is limited by the maximum number of 16 physical connection lines and the average traffic per user.

DISCLOSURE OF INVENTION

The invention has the task of increasing the number of users that can be connected to an access network of the above design.

According to a first aspect of the present invention, a method of controlling an access network having a plurality of user ports by means of an exchange connected to the access network via an interface, wherein the exchange and the access network exchange user data via a plurality of bearer channels and messages associated with different protocols via at least one control channel, each of the protocols being formed by a set of messages for performing a specific task, and the association of a message with one of the protocols being entered in the message as a part thereof, wherein via the at least one control channel, the exchange and the access network exchange messages according to one of the protocols which serves to dynamically allocate bearer channels to user ports, and wherein by means of said messages, the switching of connections between user ports and the exchange via a particular bearer channel is controlled from the exchange, is characterized in that in the protocol for the dynamic allocation of bearer channels, further messages are used for establishing and releasing internal connections in the access network, and that the establishment and release of such internal connections is controlled from the exchange by means of this extended protocol.

According to a second aspect of the present invention, an exchange comprising an interface unit for exchanging user data and messages with an access network via a plurality of bearer channels and via at least one control channel, respectively, and a control unit for remotely controlling the access network, said control unit being designed to exchange messages associated with different protocols with the access network via the interface unit, each of the protocols being formed by a set of messages for performing a specific task, and the association of a message with one of the protocols being entered in the message as a part thereof, said control unit further being designed to exchange with the access network, via one of the control channels, messages according to one of the protocols which serves to dynamically allocate bearer channels to user ports, and to control, by means of said messages, the switching of connections between user ports of the access network and the exchange via bearer channels specified by it, is characterized in that the control unit is designed to use, in the protocol for the dynamic allocation of bearer channels, further messages for establishing and releasing internal connections in the access network, and to control the establishment and release of such internal connections by means of the protocol thus extended.

According to a third aspect of the present invention, an access network comprising a plurality of user ports, an interface unit for exchanging user data and messages with an exchange via a plurality of bearer channels and via at least one control channel, respectively, a switching network for switching connections between the user ports and the bearer channels, and a control unit for controlling the access network, said control unit being designed to exchange messages associated with different protocols with the exchange via the interface unit, each of the protocols being formed by a set of messages for performing a specific task, and the association of a message with one of the protocols being entered in the message as a part thereof, the control unit being further designed to exchange with the access network, via the at least one control channel, messages according to one of the protocols which serves to dynamically allocate bearer channels to user ports, and to be controlled by means of said messages when switching the connections through the switching network, is characterized in that the switching network is designed to establish and release internal connections between user ports in response to requests from the control unit, and that the control unit is designed to use, in the protocol for the dynamic allocation of bearer channels, further messages for establishing and releasing internal connections in the access network, and to control the establishment and release of such internal connections by means of the protocol thus extended.

The basic idea of the invention is to insert an additional set of messages into the protocol for the dynamic allocation of transmission channels, for controlling the establishment and the release of interconnections in the access network. This preserves the above cited advantages of a conventional access network and, depending on the local traffic in an access network, i.e. the traffic between users of the same access network, the number of users that can be connected to the access network is increased.

With a 20% local traffic for example, the invention allows the connection of about 30% more users to the access network. This makes such an access network in accordance with the invention suitable for possible replacement of obsolete analog exchanges.

In addition, there is the advantage that the total costs per user port are correspondingly lower in a fully loaded access network. In general, the costs of the access network, the transmission technique and the exchange are reduced.

Another advantage is that the invention may need a lower number of connection lines between the access network and the exchange, for the same number of user ports.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 2 is a symbolic representation of the protocol architecture for the exchange of messages between the access network according to the invention in FIG. 1, and the exchange according to the invention in FIG. 1.

FIG. 3 is a list of messages for the exchange of messages between the access network according to the invention in FIG. 1, and the exchange according to the invention in FIG. 1.

BEST MODE FOR CARRYING OUT THE INVENTION

The following depicts the application of the method of the invention for controlling an access network in a communications system with an access network according to the invention, and an exchange according to the invention.

Figure 1:
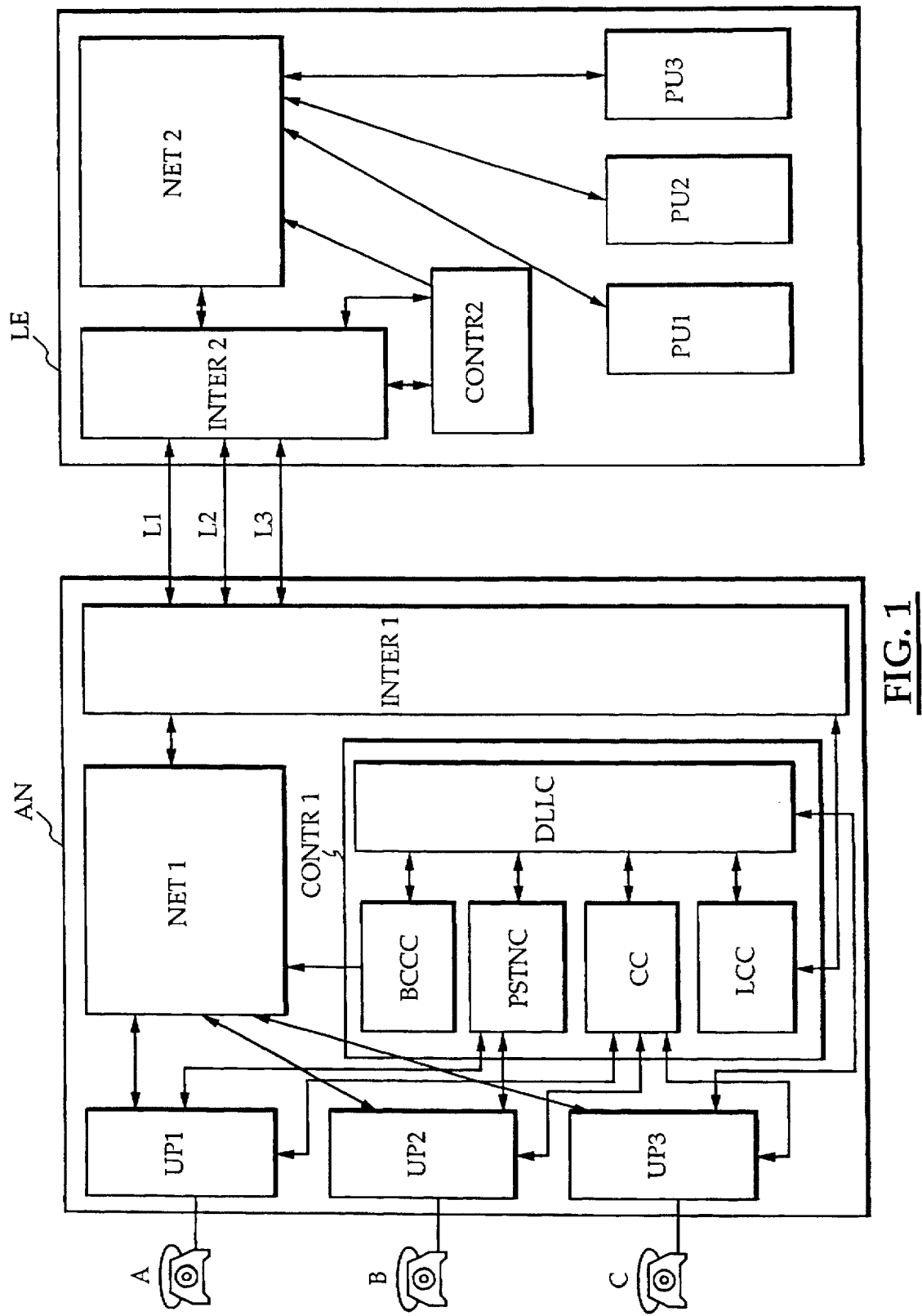
FIG. 1 is a block circuit diagram of an access network and an exchange according to the invention.

FIG. 1 illustrates an access network AN, an exchange LE and three terminals A, B and C. The three terminals A, B and C are connected to the access network AN, which is further connected to the exchange LE by 3 physical connection lines L1 to L3.

The connection lines L1 to L3 supply 32 transmission channels each of 64 kilobit/sec, of which 0 to 3 channels serve as control channels and the rest as bearer channels. However, at least one control channel is required altogether. The number of connection lines is chosen as an example and can be increased or decreased as needed.

The terminals A to C are telephone terminals, where terminals A and B are analog telephones and terminal C is an ISDN telephone. However, instead of the terminals A to C it is also possible to use other terminals, such as for example a computer for the data communication or a private branch exchange. In this instance, the number of connected terminals is chosen as an example.

In general, the access network AN is separated from the exchange LE and is controlled by it. It provides the user port units for the terminals A to C, and together with the exchange LE establishes and releases the connections of the terminals A to C.

It is also possible for the access network AN to be a logic access network. Several such logic access networks would then share the hardware resources of a physical access network.

The exchange LE controls the access network AN and performs all the exchange-switching and service-relevant tasks for the terminals A to C of the access network AN.

The access network AN comprises three user port units UP1 to UP3, one interface unit INTER1, a switching network NET1 and a control unit CONTR1.

The interface unit INTER1 exchanges data with the switching network NET1, with the control unit CONTR1, and with the exchange LE via connection lines L1 to L3. The user port units UP1 to UP3 are connected to terminals A, B or C and exchange data with the switching network NET1. The control unit CONTR1 exchanges control and status data with the interface unit INTER1 and the user port units UP1 to UP3, and sends control data to the switching network NET1.

The interface unit INTER1 provides the necessary basic transmission services for the transmission of data via connection lines L1 to L3. Beyond that, it establishes a connection of the bearer channels of connection lines L1 to L3 with the switching network NET1, and of the control channels of connection lines L1 to L3 with the control unit CONTR1.

The user port units UP1 to UP3 supply the respective user port for the terminals A to C, and lead the respective bearer channel to the switching network NET1.

It is also possible for user port units UP1 and UP2 to supply a higher rated connection, for example a 2 Mbit/sec connection, or to provide a logic interface to a user, which could potentially comprise several physical interfaces.

The switching network NET1 contains a matrix structure and its construction is similar to a cross-connect. This makes it possible to couple the bearer channels of the user port units UP1 to UP3 with each other, or with a bearer channel of the interface unit INTER1. Switching such connections through the switching network NET1 is controlled by the control unit CONTR1.

It is also possible for the switching network NET1 to have a different structure, for example a bus which is accessed by means of a distributed access method.

The switching network NET1 can also be used to connect the control channels of connection lines L1 to L3 with the control unit CONTR1.

The control unit CONTR1 receives status data from the interface unit INTER1 and the user port units UP1 to UP3, and controls these as well as the switching network NET1. It furthermore exchanges messages with the exchange LE via the interface unit INTER1, which in turn are used by the exchange LE to control it. When instructed by the exchange LE, the control unit CONTR1 controls the connection between two of the terminals A to C, or between one of terminals A to C and a bearer channel of the connection lines L1 to L3, which was selected by the exchange LE.

The exchange LE comprises an interface unit INTER2, a switching network NET2, a control unit CONTR2 and three units PU1 to PU3.

The interface unit INTER2 exchanges data with the switching network NET2, with the control unit CONTR2, and with the access network AN via the connection lines L1 to L3. Units PU1 to PU3 exchange data with the switching network NET2. The control unit CONTR2 exchanges control and status data with the interface unit INTER2 and sends control data to the switching network NET2.

The interface unit INTER2 provides the basic transmission services for the connection lines L1 to L3. Beyond that, it connects the bearer channels of connection lines L1 to L3 with the switching network NET2, and their control channels with the control unit CONTR2.

Units PU1 to PU3 are connecting units, for example for analog or digital users, for transmission lines to other exchanges, for clock pulses and tones, or for MFT signalling (MFT=multifrequency tone). In this instance, the number of three units PU1 to PU3 is chosen as an example.

The switching network NET2 is the normal switching network for an exchange. After receiving a control signal from the control unit CONTR2, it establishes connections between bearer channels of the connection lines L1 to L3, and between such bearer channels and the units PU1 to PU3.

The possible construction of the switching network NET2 and the units PU1 to PU3 can be found for example in the article "Hardware Structure", pages 135 to 147 of the magazine "Electrical Communications", 1981, Volume 58, No. 2/3.

The control unit CONTR2 controls the access network AN and the establishment of connections of terminals A to C of the access network AN. To that end, it exchanges messages with the control unit CONTR1 of access network AN via interface units INTER1 and INTER2, and in this way influences decision functions of the access network AN. It furthermore controls the interface unit INTER2, which establishes the connections to the access network AN, and causes the establishment of respective connections through the switching network NET2.

The following steps are performed by the exchange LE and the access network AN when the establishment of a connection has been initiated by a terminal of the access network AN:

The user goes off-hook. The exchange LE is informed of this by messages through the control channels. Then, upon instruction from the control unit CONTR2, control unit CONTR1 is prompted to establish a connection between the terminal and the exchange LE via a particular bearer channel of the connection lines L1 to L3 determined by the exchange LE. The dialing information from the user then reaches the exchange LE either through messages, e.g. with pulse-tone dialing, or directly in the form of tones via the bearer channels, e.g. with multifrequency dialing, and is then evaluated by the exchange LE. If it determines that the called user is also connected to the access network AN, it prompts the control unit CONTR1 to continue establishing an interconnection between these users via the switching network NET1, and subsequently clears the connection through the bearer channel of the transmission line. If this is not the case, it establishes the requested connection through the switching network NET2.

In the following, the exchange of messages between control units CONTR1 and CONTR2 is briefly explained by means of FIG. 2, before the detailed description of the control unit CONTR1 itself.

FIG. 2 illustrates the communication layers LAYER1 to LAYER3 of the access network AN and the exchange LE. The layers LAYER3 to LAYER1 comprise four protocols PSTNP, LCP, CP and BCCP, three services LINK, DLINK and MAPP or two physical transmission paths D16 and C64.

The layer LAYER1 represents the physical (bit) layer. It is formed between the access network AN and the exchange LE by the transmission paths C64 supplied by the control channels of the connection lines L1 to L3, each of which has a bit rate of 64 kilobit/sec. The connection between the ISDN terminal C and the access network AN is established by the respective layer of the ISDN channel as the transmission path D16 of the communications layer LAYER1.

The exchange LE controls the functions in the access network AN by means of the four protocols PSTNP to BCCP of the communications layer LAYER3. Each of these protocols is designed to fulfill a very special control task, and to that end has available a special set of messages. Each message from such a set of messages contains a specific protocol identification, which only allocates it to one particular protocol PSTNP to BCCP.

It is also possible that other or further protocols are provided for protocols PSTNP to CP. For example, in addition to protocols PSTNP to BCCP, a protocol can be provided which maintains the respective connections or control channels when one of the connection lines L1 to L3 fails.

The layer LAYER2 is the safety layer which, on the one hand, provides the service LINK to the protocols PSTNP to BCCP, for the safe transmission of messages. On the other hand, it transparently and safely transmits the data from the D channel of terminal C to the exchange LE, where it makes them available via the service DLINK of layer LAYER3. To that effect it utilizes the service MAPP, which joins these two message streams into a single message stream, and separates it again into two message streams after the transmission.

In the following, the control unit CONTR1 will now be described in more detail by means of FIG. 1:

The control unit CONTR1 comprises five processing units BCCC, PSTNC, CC, LCC and DLLC. The processing unit DLLC exchanges messages with processing units BCCC to LCC, with interface unit INTER1 and with the user port unit UP3. The processing unit BCCC sends control data to the switching network NET1. The processing unit PSTNC exchanges data with user port units UP1 and UP2. The processing unit CC exchanges data with interface units UP1 to UP3. The processing unit LCC exchanges data with the interface unit INTER1.

Each processing unit BCCC to LCC fulfills a special task and to that end exchanges messages with the control unit CONTR2 in accordance with a special protocol of communications layer LAYER3, namely according to protocols BCCP, PSTNP, CCP or LCCP. The processing unit DLLC provides for the safe transmission of these messages and the ISDN D-channel signalling messages from the terminal C to the control unit CONTR2 via the safety layer LAYER2, and informs the processing units BCCC, PSTNC, CC or LCC or the ISDN D-channel of terminal C of the messages arriving from the control unit CONTR2.

The processing units CC and LCC control and monitor the user port units UP1 to UP3 or the interface unit INTER1. The processing unit PSTNC controls the analog user signals of user port units UP1 and UP2.

The processing unit BCCC controls the establishment of connections through the switching network NET1. From the exchange LE it receives the corresponding instructions regarding which connections must be established. The protocol BCCP used for this communication is primarily a protocol which serves to dynamically allocate the bearer channels of connection lines L1 to L3 to the individual terminals A to C. This protocol also contains additional messages, whereby the switching network NET1 can establish interconnections between the terminals A to C.

In the following, the set of messages forming the basis of protocol BCCP will be explained in more detail by means of FIG. 3.

FIG. 3 depicts a set of 17 messages M1 to M17, which form the basis of protocol BCCP. In FIG. 3, each of the messages M1 to M17 is assigned its identification and the direction in which it is sent.

The message M1 is sent by the exchange LE to the access network AN, and allocates a bearer channel in one of the connection lines L1 to L3 to one of terminals A to C. In addition to an identification for the protocol BCCP, the message M1 contains an identification that is specific for this message, and an identification for the particular terminal and the particular bearer channel.

If the control unit CONTR1 has successfully established the requested connection through the switching network NET1, it sends the message M2 to the exchange LE. However, if it was unable to comply, it sends the message M3. In addition to an identification for the protocol BCCP, each of the messages M2 and M3 contains a message-specific identification, and message M3 contains an additional identification which describes the reason for the rejection.

Messages M4 to M6 correspond to messages M1, M2 or M3, respectively. They serve to release the connection established by messages M1 to M3 via a predetermined bearer channel.

The message M7 is sent by the exchange LE to the access network AN and requests the processing unit BCCC to establish an interconnection between two of the terminals A to B through the switching network NET1. In addition to the self-specifying identifications, it contains the identifications of the predetermined terminals.

It is also possible to establish an interconnection between more than two terminals, as is the case with a conference connection, for example.

The messages M8 and M9 are sent by the processing unit BCCC to the exchange LE, to confirm the establishment of a requested interconnection, or to indicate any noncompliance with this request. They are constructed in accordance with messages M2 or M3.

The messages M10 to M12 correspond to messages M7, M8 or M9, and serve to release any interconnection established by the messages M7 to M9.

The message M13 is sent by the exchange LE to the processing unit BCCC and requests it to release an existing interconnection between the terminals of terminals A to C through the switching network NET1, and to establish a connection with the exchange LE for each of these terminals, via one of the predetermined bearer channels of connection lines L1 to L3. In addition to the protocol and the message identifications, message M13 contains the identifications of those terminals between which an interconnection exists, as well as the identifications of the selected bearer channels of connection lines L1 to L3.

The messages M14 and M15 are sent by the processing unit BCCC to the exchange LE, to acknowledge by means of message M13 that the request has been carried out, or to indicate its noncompliance. They are constructed in accordance with messages M2 or M3.

The message M16 is sent by the exchange LE to the access network AN. This message requests the access network AN to inform the exchange by means of message M17 of the status of an interconnection which is specified in message M16. In addition to protocol and message identifications, the messages M16 and M17 contain the specification of one or more interconnections, or the data regarding the status of one or more interconnections.

It is also possible for the set of messages on which the protocol BCCP is based to contain other messages as well. It is furthermore possible to omit the messages M13 to M17. The messages M13 to M15 serve mainly to increase the speed when an additional service is requested during the existence of an interconnection, which in turn requires a bearer channel connection with the exchange LE. Additional use of these messages is possible, particularly for releasing an interconnection.

If one of terminals A to C requests such an additional service, for example a conference connection, call hold or call waiting at another terminal, the processing unit PSTNC informs the control unit CONTR2 of this by means of protocol PSTNP, or via a transparently transmitted ISDN D-channel. The latter then sends the message M13 to the control unit CONTR1, thereby releasing the interconnection and replacing it with two connections to the exchange LE. The control unit CONTR2 is now in a position to establish a connection that corresponds to the additional service via the switching network NET2, thus a connection to a touch-tone dial receiver of the exchange LE, for example.

The following explains a possibility of establishing a connection between two terminals of access network AN by establishing a connection between the terminals A and B, for example.

Figure 4:
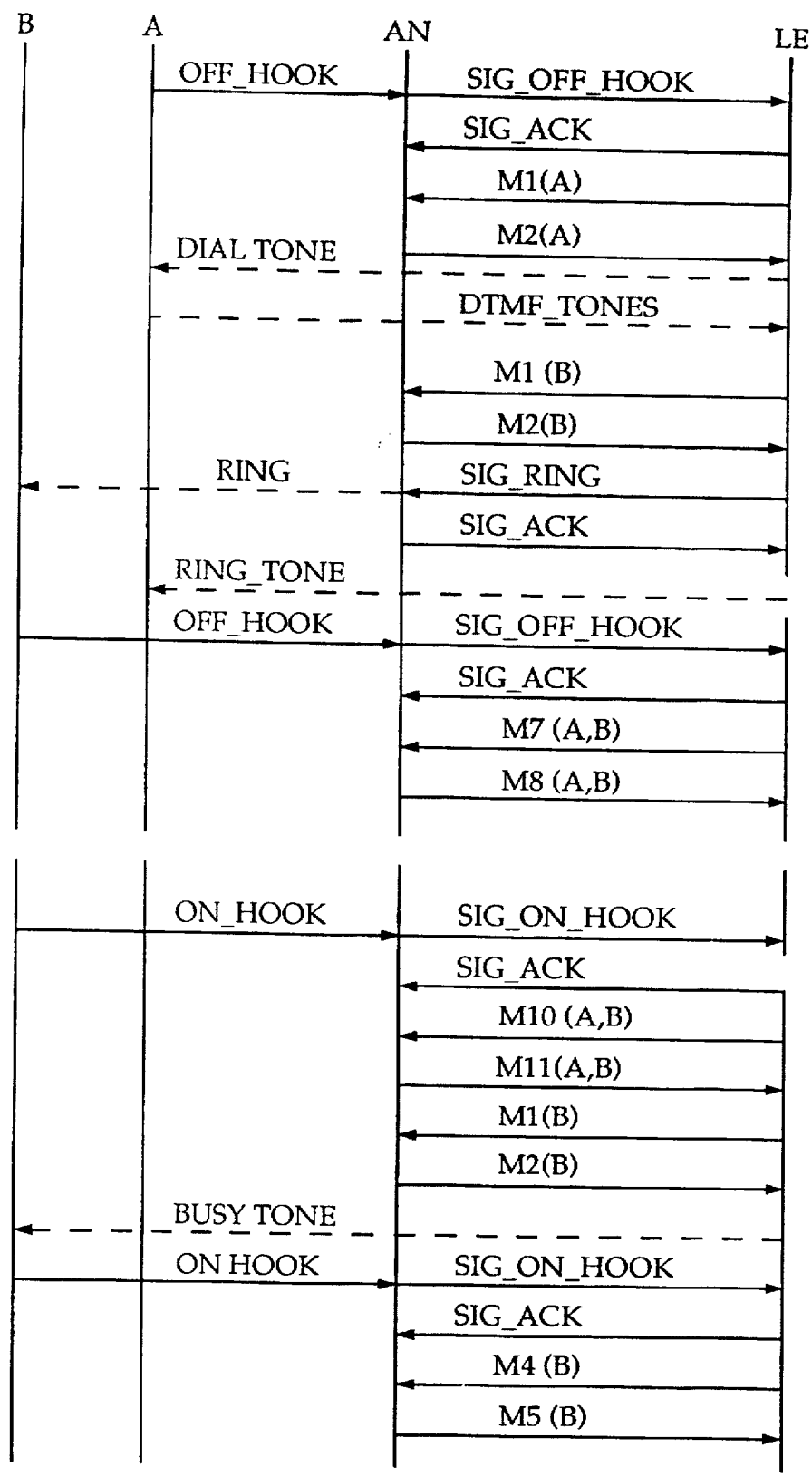
FIG. 4 is a flow diagram of a connection established between two users connected to the access network according to the invention in FIG. 1.

FIG. 4 illustrates the exchange of messages between the terminals A and B, the access network AN and the exchange LE for establishing the connection. The transmission of a message is always represented by a corresponding arrow.

The user at terminal A goes off-hook and a corresponding OFF_HOOK event is detected by the user port unit UP1 of access network AN. It then routes the information to the processing unit PSTNC, which sends a SIG_OFF_HOOK message to the exchange LE. The latter acknowledges the reception of the message with a SIG_ACK message.

In addition, the exchange LE determines a free bearer channel and sends a message M1(A) to the access network AN, whereby it requests to establish a connection between the bearer channel and the user port unit UP. The establishment of the connection is acknowledged by the access network AN with a message M2(A).

After the message M2(A) is received, the exchange LE connects the terminal A with one of units PU1 to PU3, which contains a generator to produce the dial tone and a device to evaluate the frequency selection information. The device then sends a dial tone DIAL_TONE to the terminal A, and the frequency selection information DTMP_TONES, which were input by the user, are evaluated by this device.

It is also possible for the terminal A to use the pulse tone method. In that case the pulse tone information is evaluated by the processing unit PSTNC and is sent to the exchange LE by means of corresponding messages.

The user at terminal A dials the terminal B. This is recognized by the exchange LE as belonging to the same access network AN. It then sends a message M1(B) to the access network AN requesting it to establish a connection between it and the terminal B via a bearer channel it has selected. The reception of this message is acknowledged by the access network AN with a message M2(B). It furthermore sends a SIG_RING message to the processing unit PSTNC, which causes the latter to send a ringing signal RING to the terminal B by applying ringing current to the user port unit UP2. The successful sending of the ringing signal RING is acknowledged by the processing unit PSTNC with the SIG_ACK message. Subsequently the exchange sends a ringing tone RING_TONE to the terminal A via the bearer channel.

If the user of terminal B goes off-hook, the user port unit UP2 detects the OFF_HOOK event and automatically stops sending the RING signal to the terminal B. The exchange LE is informed of the occurrence of this signal with the SIG-OFF-HOOK message, whereupon it acknowledges the reception with the SIG-ACK message. In addition, the exchange LE stops sending the ringing signal RING-TONE to the terminal A and sends a message M7(A,B) to the processing unit BCCC, whereby the latter establishes an interconnection between the terminals A and B. This is acknowledged with a message M8(A,B).

Figure 5:
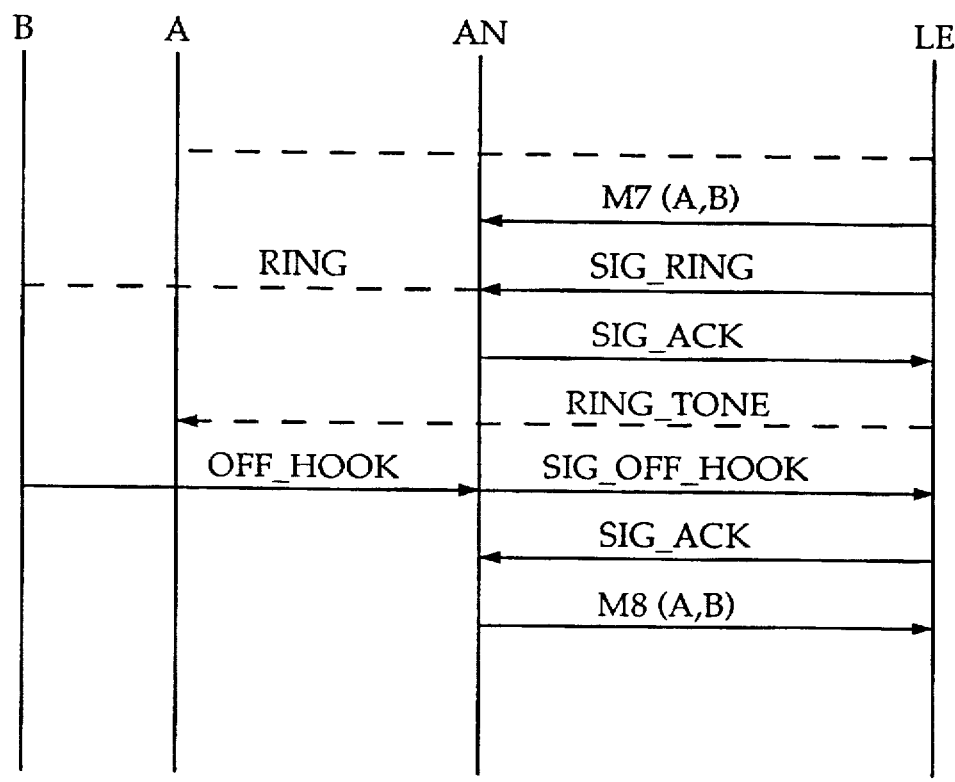
FIG. 5 is a flow diagram of an alternative of the connection established in FIG. 4.

It is also possible for the exchange LE to send the message M7(A,B) to the access network AN as soon as it knows that a connection should be established between terminals A and B. This possible alternative will now be briefly explained by means of FIG. 5.

After it receives the dial information DTMF_TONES, the exchange LE determines that an interconnection should be established between the terminals A and B. A message M7(A,B) is then sent to the access network. The latter however waits to establish the interconnection until it detects the off-hook condition caused by the user at terminal B by detecting the OFF_HOOK event. Meanwhile as in FIG. 4, the ringing signal RING is sent to the terminal B, as well as the ringing tone RING_TONE is sent to terminal A. The access network AN only establishes the interconnection when the user of terminal B goes off-hook, and this is then acknowledged to the exchange LE with the message M8(A, B).

This sequence requires somewhat more control in the access network AN, but needs fewer messages and is therefore somewhat faster.

Referring back to FIG. 4, when the user hangs up terminal A after the call, the access network AN detects an ON_HOOK event at terminal A. It informs the exchange LE of this with a SIG-ON-HOOK message. The exchange LE acknowledges this message with the SIG_ACK message and sends the message M10(A,B) to the access network AN, which then interrupts the interconnections between the terminals A and B and acknowledges this with the message M11(A,B). Next, the exchange LE sends the message M1(B) to the access network AN, which thereupon establishes a connection between the terminal B and the exchange LE via a bearer channel that was determined by the exchange LE. The access network AN then acknowledges the establishment of the connection with the message M2(B), and thereupon the exchange LE applies a tone generator to the bearer channel, which sends a BUSY_TONE busy signal to the terminal B via this connection.

If the access network AN receives the ON_HOOK signal from the terminal B, it routes this to the exchange LE with the SIG_CON_HOOK message, which acknowledges the reception with the SIG_ACK message and sends the return message M4(B) to the access network AN. The latter then establishes the connection between the terminal B and the exchange LE and acknowledges this with the message M5(B).

It is also possible for the acknowledgment by means of the SIG_ACK message to take place less frequently, and that the carrying out of several assignments is acknowledged with only one SIG_ACK message.

I claim:

1. A method of controlling an access network (AN) having a plurality of user ports by means of an exchange (LE) connected to the access network (AN) via an interface, wherein the exchange (LE) and the access network (AN) exchange user data via a plurality of bearer channels and messages associated with different protocols (PSTNP, LCP, CP, BCCP) via at least one control channel, each of the protocols (PSTNP, LCP, CP, BCCP) being formed by a set of messages for performing a specific task, and the association of a message with one of the protocols (PSTNP, LCP, CP, BCCP) being entered in the message as a part thereof, wherein via the at least one control channel, the exchange (LE) and the access network (AN) exchange messages according to one (BCCP) of the protocols which serves to dynamically allocate bearer channels to user ports, and wherein by means of said messages, the switching of connections between user ports and the exchange (LE) via a particular bearer channel is controlled from the exchange (LE), characterized in that the protocol (BCCP) for the dynamic allocation of bearer channels is extended with further messages (M7 to M15) for use in establishing and releasing internal connections in the access network (AN), and that the establishment and release of such internal connections is controlled from the exchange (LE) by means of this extended protocol (BCCP).

2. A method as claimed in claim 1, characterized in that the exchange (LE) sends to the access network (AN) a first further message (M7) or a second further message (M10) according to the extended protocol (BCCP) which causes an internal connection in the access network (AN) between the user ports specified in the message (M7; M10) to be established or released, respectively.

3. A method as claimed in claim 1, characterized in that the exchange (LE) sends to the access network (AN) a third further message (M13) according to the extended protocol (BCCP) which causes the access network (AN) to release a connection between the user ports specified in the message (M13) and to subsequently establish connections between the exchange (LE) and said user ports via bearer channels specified in said message (M13).

4. A method as claimed in claim 2, characterized in that the exchange (LE) sends the first further message (M7) to the access network (AN) when it has identified the calling user and the called user as belonging to the same access network (AN) and the access network (AN) indicates to it that the called user has answered.

5. A method as claimed in claim 2, characterized in that the exchange sends the first further message (M7) to the access network (AN) when it has identified the calling user and the called user as belonging to the same access network (AN), and that after reception of the first further message (M7), the access network (AN) does not establish an internal connection until it determines that the called user goes off-hook.

6. A method as claimed in claim 2, characterized in that the exchange (LE) sends the second further message (M10) to the access network (AN) when the access network (AN) indicates to it that a user has hung up and when it has allocated an internal connection to said user.

7. A method as claimed in claim 3, characterized in that the exchange (LE) sends the third further message (M13) to the access network (AN) when the user of an internal connection requests an additional service which requires one or more bearer channels to the exchange (LE).

8. An exchange (LE) comprising an interface unit (INTER2) for exchanging user data and messages with an access network (AN) via a plurality of bearer channels and via at least one control channel, respectively, and a control unit (CONTR2) for remotely controlling the access network (AN), said control unit (CONTR2) being designed to exchange messages associated with different protocols (PSTNP, LCP, CP, BCCP) with the access network (AN) via the interface unit (INTER2), each of the protocols (PSTNP, LCP, CP, BCCP) being formed by a set of messages for performing a specific task, and the association of a message with one of the protocols (PSTNP, LCP, CP, BCCP) being entered in the message as a part thereof, said control unit (CONTR2) further being designed to exchange with the access network (AN), via said at least one control channel, messages according to one (BCCP) of the protocols which serves to dynamically allocate bearer channels to user ports, and to control, by means of said messages, the switching of connections between user ports of the access network (AN) and the exchange (LE) via bearer channels specified by the exchange, characterized in that the control unit (CONTR2) is designed to use the protocol (BCCP) for the dynamic allocation of bearer channels extended by further messages (M7 to M15) for establishing and releasing internal connections in the access network (AN), and to control the establishment and release of such internal connections by means of the protocol (BCCP) thus extended.

9. An access network (AN) comprising a plurality of user ports (UP1 to UP3), an interface unit (INTER1) for exchanging user data and messages with an exchange (LE) via a plurality of bearer channels and via at least one control channel, respectively, a switching network (NET1) for switching connections between the user ports (UP1 to UP3) and the bearer channels, and a control unit (CONTR1) for controlling the access network (AN), said control unit (CONTR1) being designed to exchange messages associated with different protocols (PSTNP, LCP, CP, BCCP) with the exchange (LE) via the interface unit (INTER1), each of the protocols (PSTNP, LCP, CP, BCCP) being formed by a set of messages for performing a specific task, and the association of a message with one of the protocols (PSTNP, LCP, CP, BCCP) being entered in the message as a part thereof, the control unit (CONTR1) being further designed to exchange with the access network (AN), via the at least one control channel, messages according to one (BCCP) of the protocols which serves to dynamically allocate bearer channels to user ports, and to be controlled by means of said messages when switching the connections through the switching network (NET1), characterized in that the switching network (NET1) is designed to establish and release internal connections between user ports (UP1 to UP3) in response to requests from the control unit (CONTR1), and that the control unit (CONTR2) is designed to use the protocol (BCCP) for the dynamic allocation of bearer channels extended by further messages (M7 to M15) for establishing and releasing internal connections in the access network (AN), and to control the establishment and release of such internal connections by means of the protocol (BCCP) thus extended.

* * * * *